US010193602B1

(12) United States Patent
Frydman et al.

(10) Patent No.: US 10,193,602 B1
(45) Date of Patent: Jan. 29, 2019

(54) THERMAL THROTTLING USING RF DIVERSITY

(71) Applicant: QUALCOMM Incorporated, San Diego, CA (US)

(72) Inventors: Javier Frydman, Tel-Mond (IL); Ron Gutierrez, Pardes Hana Karkur (IL); Nissan Aloni, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/693,179

(22) Filed: Aug. 31, 2017

(51) Int. Cl.
| H04B 17/18 | (2015.01) |
| H04B 17/309 | (2015.01) |
| H04W 52/26 | (2009.01) |
| H04B 7/06 | (2006.01) |
| H04B 17/10 | (2015.01) |
| H04W 52/02 | (2009.01) |

(52) U.S. Cl.
CPC ......... *H04B 7/0608* (2013.01); *H04B 17/104* (2015.01); *H04B 17/18* (2015.01); *H04W 52/0206* (2013.01); *H04W 52/028* (2013.01)

(58) Field of Classification Search
CPC .......... H04B 1/38; H04B 17/00; H04B 17/18; H04B 17/309; H04W 24/04; H04W 52/02; H04W 52/26
See application file for complete search history.

(56) References Cited

U.S. PATENT DOCUMENTS

| 5,519,886 | A | * | 5/1996 | Gilbert | H03F 1/52 455/115.1 |
| 7,860,018 | B2 | | 12/2010 | Raith | |
| 8,452,323 | B2 | * | 5/2013 | Anderson | H04B 1/005 455/522 |
| 8,675,615 | B2 | | 3/2014 | Anderson et al. | |
| 8,918,563 | B2 | * | 12/2014 | Ehsan | H04L 47/263 370/232 |
| 9,019,880 | B2 | * | 4/2015 | Ehsan | H04W 52/146 370/311 |
| 9,521,246 | B2 | * | 12/2016 | Hsu | H04M 1/72569 |
| 9,557,786 | B2 | | 1/2017 | Wang et al. | |
| 9,615,304 | B2 | | 4/2017 | Breuer et al. | |
| 9,817,454 | B2 | * | 11/2017 | Wang | G06F 1/324 |
| 2008/0025341 | A1 | * | 1/2008 | Rao | H04W 72/048 370/468 |

(Continued)

OTHER PUBLICATIONS

International Search Report and Written Opinion—PCT/US2018/039979—ISA/EPO—dated Oct. 2, 2018.

*Primary Examiner* — Blane Jackson
(74) *Attorney, Agent, or Firm* — Loza & Loza, LLP

(57) ABSTRACT

In certain aspects, a method for communications comprises outputting a first portion of a signal to a first one of a plurality of RF modules for transmission, determining a throughput of the first one of the plurality of RF modules during thermal throttling of the first one of the plurality of RF modules, comparing the determined throughput of the first one of the plurality of RF modules with a throughput of a second one of the plurality of RF modules, and outputting a second portion of the signal to the second one of the plurality of RF modules for transmission if the throughput of the second one of the plurality of RF modules is higher than the determined throughput of the first one of the plurality of RF modules.

19 Claims, 8 Drawing Sheets

(56) References Cited

U.S. PATENT DOCUMENTS

| | | | |
|---|---|---|---|
| 2008/0284609 A1* | 11/2008 | Rofougaran | G01K 1/024 |
| | | | 340/584 |
| 2008/0285633 A1* | 11/2008 | Rofougaran | H04Q 9/00 |
| | | | 375/219 |
| 2010/0091747 A1* | 4/2010 | Dorsey | H04B 1/036 |
| | | | 370/338 |
| 2010/0330950 A1* | 12/2010 | Wells | H04B 1/3883 |
| | | | 455/404.1 |
| 2013/0051438 A1 | 2/2013 | Lee et al. | |
| 2015/0133103 A1* | 5/2015 | Lee | H03F 1/526 |
| | | | 455/418 |
| 2016/0183117 A1 | 6/2016 | Hsu et al. | |
| 2017/0167745 A1 | 6/2017 | Dortmund et al. | |

* cited by examiner

THERMAL THROTTLING USING RF DIVERSITY

FIELD

The present disclosure generally relates to wireless communications and, more particularly, to methods and apparatuses for thermal throttling using RF diversity.

BACKGROUND

Radio Frequency (RF) diversity improves performance by providing two or more RF modules on a wireless communication device, and selecting the RF module that provides the best link quality (e.g., throughput) for reception and/or transmission. Each RF module may include one or more antennas and an RF circuit, in which the RF circuit is configured to receive and/or transmit RF signals via the respective one or more antennas.

SUMMARY

One aspect relates to an apparatus for wireless communications. The apparatus comprises an interface, and a processing system. The processing system is configured to determine a link quality for each one of a plurality of radio frequency (RF) modules, select a first one of the plurality of RF modules having a highest determined link quality, generate a signal, configure the interface to output a first portion of the signal to the first one of the plurality of RF modules for transmission, determine a throughput of the first one of the plurality of RF modules during thermal throttling of the first one of the plurality of RF modules, compare the determined throughput of the first one of the plurality of RF modules with a throughput of a second one of the plurality of RF modules, and configure the interface to output a second portion of the signal to the second one of the plurality of RF modules for transmission if the throughput of the second one of the plurality of RF modules is higher than the determined throughput of the first one of the plurality of RF modules.

A second aspect relates to a method for wireless communications. The method comprises determining a link quality for each one of a plurality of radio frequency (RF) modules, selecting a first one of the plurality of RF modules having a highest determined link quality, and outputting a first portion of a signal to the first one of the plurality of RF modules for transmission. The method also comprises determining a throughput of the first one of the plurality of RF modules during thermal throttling of the first one of the plurality of RF modules, comparing the determined throughput of the first one of the plurality of RF modules with a throughput of a second one of the plurality of RF modules, and outputting a second portion of the signal to the second one of the plurality of RF modules for transmission if the throughput of the second one of the plurality of RF modules is higher than the determined throughput of the first one of the plurality of RF modules.

A third aspect relates to an apparatus for wireless communications. The apparatus comprises means for determining a link quality for each one of a plurality of radio frequency (RF) modules, means for selecting a first one of the plurality of RF modules having a highest determined link quality, and means for outputting a first portion of a signal to the first one of the plurality of RF modules for transmission. The apparatus also comprises means for determining a throughput of the first one of the plurality of RF modules during thermal throttling of the first one of the plurality of RF modules, means for comparing the determined throughput of the first one of the plurality of RF modules with a throughput of a second one of the plurality of RF modules, and means for outputting a second portion of the signal to the second one of the plurality of RF modules for transmission if the throughput of the second one of the plurality of RF modules is higher than the determined throughput of the first one of the plurality of RF modules.

A fourth aspect relates to a computer readable medium comprising instructions for determining a link quality for each one of a plurality of radio frequency (RF) modules, selecting a first one of the plurality of RF modules having a highest determined link quality, and outputting a first portion of a signal to the first one of the plurality of RF modules for transmission. The computer readable medium also comprises instructions for determining a throughput of the first one of the plurality of RF modules during thermal throttling of the first one of the plurality of RF modules, comparing the determined throughput of the first one of the plurality of RF modules with a throughput of a second one of the plurality of RF modules, and outputting a second portion of the signal to the second one of the plurality of RF modules for transmission if the throughput of the second one of the plurality of RF modules is higher than the determined throughput of the first one of the plurality of RF modules.

A fifth aspect relates to a wireless node. The wireless node comprises a plurality of radio frequency (RF) modules, an interface, and a processing system. The processing system is configured to determine a link quality for each one of the plurality of RF modules, select a first one of the plurality of RF modules having a highest determined link quality, generate a signal, configure the interface to output a first portion of the signal to the first one of the plurality of RF modules for transmission, determine a throughput of the first one of the plurality of RF modules during thermal throttling of the first one of the plurality of RF modules, compare the determined throughput of the first one of the plurality of RF modules with a throughput of a second one of the plurality of RF modules, and configure the interface to output a second portion of the signal to the second one of the plurality of RF modules for transmission if the throughput of the second one of the plurality of RF modules is higher than the determined throughput of the first one of the plurality of RF modules.

A sixth aspect relates to an apparatus for wireless communications. The apparatus comprises an interface and a processing system. The processing system is configured to determine a link quality for each one of a plurality of radio frequency (RF) modules, select a first one of the plurality of RF modules having a highest determined link quality, configure the interface to receive a first portion of a signal from the first one of the plurality of RF modules, determine a throughput of the first one of the plurality of RF modules during thermal throttling of the first one of the plurality of RF modules, compare the determined throughput of the first one of the plurality of RF modules with a throughput of a second one of the plurality of RF modules, and configure the interface to receive a second portion of the signal from the second one of the plurality of RF modules if the throughput of the second one of the plurality of RF modules is higher than the determined throughput of the first one of the plurality of RF modules.

A seventh aspect relates to a method for wireless communication. The method comprises determining a link quality for each one of a plurality of radio frequency (RF) modules, selecting a first one of the plurality of RF modules having a highest determined link quality, and receiving a first portion of a signal from the first one of the plurality of RF modules. The method also comprises determining a throughput of the first one of the plurality of RF modules during thermal throttling of the first one of the plurality of RF modules, comparing the determined throughput of the first one of the plurality of RF modules with a throughput of a second one of the plurality of RF modules, and receiving a second portion of the signal from the second one of the plurality of RF modules if the throughput of the second one of the plurality of RF modules is higher than the determined throughput of the first one of the plurality of RF modules.

An eighth aspect relates to an apparatus for wireless communications. The apparatus comprises means for determining a link quality for each one of a plurality of radio frequency (RF) modules, means for selecting a first one of the plurality of RF modules having a highest determined link quality, and means for receiving a first portion of a signal from the first one of the plurality of RF modules. The apparatus also comprises means for determining a throughput of the first one of the plurality of RF modules during thermal throttling of the first one of the plurality of RF modules, means for comparing the determined throughput of the first one of the plurality of RF modules with a throughput of a second one of the plurality of RF modules, and means for receiving a second portion of the signal from the second one of the plurality of RF modules if the throughput of the second one of the plurality of RF modules is higher than the determined throughput of the first one of the plurality of RF modules.

A ninth aspect relates to a computer readable medium comprising instructions for determining a link quality for each one of a plurality of radio frequency (RF) modules, selecting a first one of the plurality of RF modules having a highest determined link quality, and receiving a first portion of a signal from the first one of the plurality of RF modules. The computer readable medium also comprises instructions for determining a throughput of the first one of the plurality of RF modules during thermal throttling of the first one of the plurality of RF modules, comparing the determined throughput of the first one of the plurality of RF modules with a throughput of a second one of the plurality of RF modules, and receiving a second portion of the signal from the second one of the plurality of RF modules if the throughput of the second one of the plurality of RF modules is higher than the determined throughput of the first one of the plurality of RF modules.

A tenth aspect relates to a wireless node. The wireless node comprises a plurality of radio frequency (RF) modules, an interface, and a processing system. The processing system is configured to determine a link quality for each one of the plurality of RF modules, select a first one of the plurality of RF modules having a highest determined link quality, configure the interface to receive a first portion of a signal from another wireless node via the first one of the plurality of RF modules, determine a throughput of the first one of the plurality of RF modules during thermal throttling of the first one of the plurality of RF modules, compare the determined throughput of the first one of the plurality of RF modules with a throughput of a second one of the plurality of RF modules, and configure the interface to receive a second portion of the signal from the other wireless node via the second one of the plurality of RF modules if the throughput of the second one of the plurality of RF modules is higher than the determined throughput of the first one of the plurality of RF modules.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
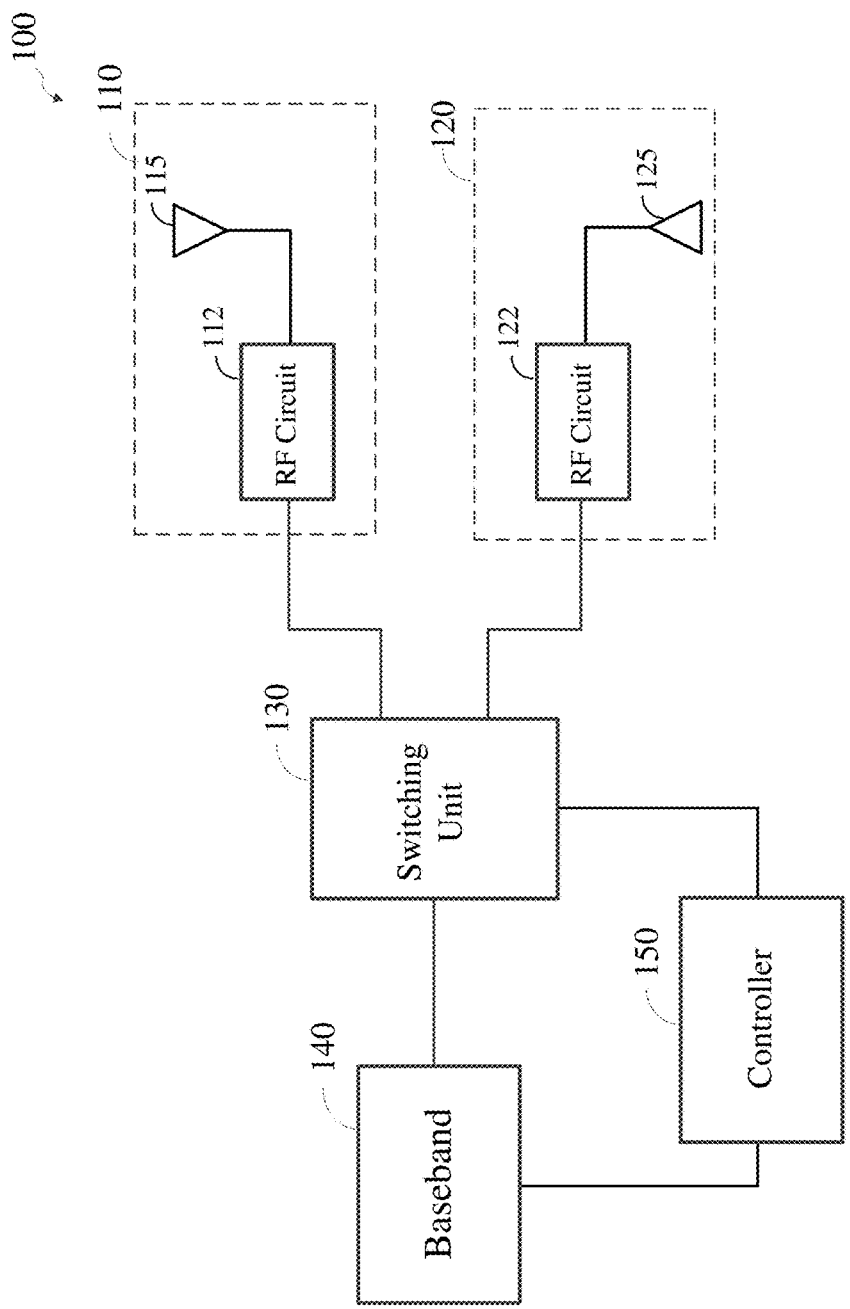
FIG. 1 shows an example of a system including two or more RF modules for RF diversity according to certain aspects of the present disclosure.

FIG. 1 shows an example of an RF diversity system 100 according to certain aspects of the present disclosure. The system 100 may be incorporated in a wireless device (e.g., an access point or an access terminal). The system 100 includes a first RF module 110, a second RF module 120, a switching unit 130, a baseband processor 140 (also referred to as a baseband modem), and an RF diversity controller 150. The switching unit 130 is configured to couple one of the RF modules 110 and 120 to the baseband processor 140 at a given time.

The first RF module 110 includes one or more antennas 115 and an RF circuit 112 (e.g., frequency converter, filter, amplifier, etc.). Similarly, the second RF module 120 includes one or more antennas 125 and an RF circuit 122 (e.g., frequency converter, filter, amplifier, etc.). The antennas 115 and 125 of the RF modules 110 and 120 may point in different directions to provide antenna diversity. For example, the antennas 115 and 125 may point in approximately opposite directions. Although two RF modules 110 and 120 are shown in FIG. 1, it is to be appreciated that the RF diversity system 100 may include a larger number of RF modules.

In operation, the controller 150 determines a link quality (e.g., throughput) for each RF module 110 and 120, and selects the RF module having the best link quality for RF transmission and/or reception. The controller 150 then instructs (configures) the switching unit 130 to couple the selected RF module 110 or 120 to the baseband processor 140. After the switch, the system 100 receives and/or transmits RF signals using the selected RF module 110 or 120.

To transmit data, the baseband processor 140 receives data (e.g., data bits) to be transmitted to a target wireless device (e.g., an access point or an access terminal). The data may come from another component (not shown) in the same wireless device as the baseband processor 140.

The baseband processor 140 processes the received data for transmission to the target wireless device. For example, the baseband processor 140 may convert the received data into data symbols using any one of a plurality of different modulation schemes, including, but not limited to, BPSK, QPSK, 16QAM, 64QAM, 64APSK, 128APSK, 256QAM, and 256APSK. The baseband processor 140 may also perform other operations such as data coding, inserting the data symbols into one or more data packets or frames, etc. The baseband processor 140 then outputs a baseband signal including the data symbols to the selected RF module 110 or 120.

The RF circuit 112 or 122 of the selected RF module 110 or 120 frequency up-converts the received baseband signal into an RF signal (e.g., by mixing the baseband signal with a high-frequency oscillator signal from a local oscillator (LO)), and amplifies the RF signal (e.g., using one or more power amplifiers (PAs)). The amplified RF signal is then transmitted via the respective one or more antennas 115 or 125.

To receive data, the RF circuit 112 or 122 of the selected RF module 110 or 120 receives an RF signal via the respective one or more antennas 115 or 125, amplifies the received RF signal (e.g., using one or more low noise amplifiers (LNAs)), and frequency down-converts the amplified RF signal into a baseband signal. The baseband signal is then output to the baseband processor 140.

The baseband processor 140 may recover data symbols from the baseband signal, and convert the recovered data symbols into data (e.g., data bits). The baseband processor 140 may then output the data to another component (not shown) in the same wireless device as the baseband processor 140 for further processing.

It is to be appreciated that the operations of the baseband processor 140 and RF modules 110 and 120 discussed above are exemplary, and that the baseband processor 140 and RF modules 110 and 120 may perform other operations in addition to the operations discussed above.

As discussed above, the controller 150 determines a link quality for each RF module 110 and 120, and selects the RF module having the best (highest) link quality for RF transmission and/or reception. The controller 150 may determine the link quality for each RF module 110 and 120 using any one of a variety of techniques.

For example, for reception, the controller 150 may determine a link quality (e.g., throughput) for an RF module by having the RF module receive an RF signal from a target wireless device, measuring one or more parameters of the received signal that are indicative of link quality, and determining the link quality based on the one or more measured parameters. The one or more parameters may include, for example, a signal-to-noise ratio (SNR), a received signal strength indictor (RSSI), a carrier-to-interference (C/I) ratio, estimated channel between the RF module and the target wireless device, etc. In this example, a higher SNR, RSSI or C/I ratio is generally indicative of a higher link quality. The baseband processor 140 or another component may measure the one or more parameters of the received signal, and report the measured one or more parameters to the controller 150. The controller 150 may repeat the above procedure for each of the RF modules 110 and 120 to determine a link quality for each of the RF modules 110 and 120.

For transmission, the controller 150 may determine a link quality (e.g., throughput) for an RF module by having the RF module transmit an RF signal to a target wireless device, receiving one or more measured parameters from the target wireless device that are indicative of link quality, and determining the link quality based on the one or more measured parameters. In this example, the target wireless device measures the one or more parameters of the signal received at the target wireless device, and reports the one or more measured parameters to the controller 150 (e.g., via a wireless link). The one or more parameters may include, for example, a signal-to-noise ratio (SNR), a received signal strength indictor (RSSI), a carrier-to-interference (C/I) ratio, estimated channel between the RF module and the target wireless device, etc. In this example, a higher SNR, RSSI or C/I ratio is generally indicative of a higher link quality. In one example, the target wireless device may determine the throughput (e.g., data rate) based on the one or more measured parameters, and report the determined throughput to the controller 150 (e.g., via a wireless link). In this example, the system may transmit data at the throughput specified by the target wireless device. The controller 150 may repeat the above procedure for each of the RF modules 110 and 120 to determine a link quality for each of the RF modules 110 and 120.

It is to be appreciated that the techniques for determining link quality discussed above are exemplary, and that other techniques for determining link quality may be used in addition to the techniques discussed above.

The system 100 may employ thermal throttling to prevent the system 100 from crossing a critical temperature, which can lead to overheating and damage the system. The critical temperature may be based on a temperature at which the system no longer operates reliability and/or a temperature that causes damage to a user's skin that is in contact with an outer housing enclosing the system. When the temperature of the system (or part of the system) is close to the critical temperature, the system starts thermal throttling, in which the system is forced to sleep during sleep intervals to stop thermal heating. When the system executes thermal throttling, the throughput of the system is reduced since the active duty cycle of the system is reduced.

Figure 2:
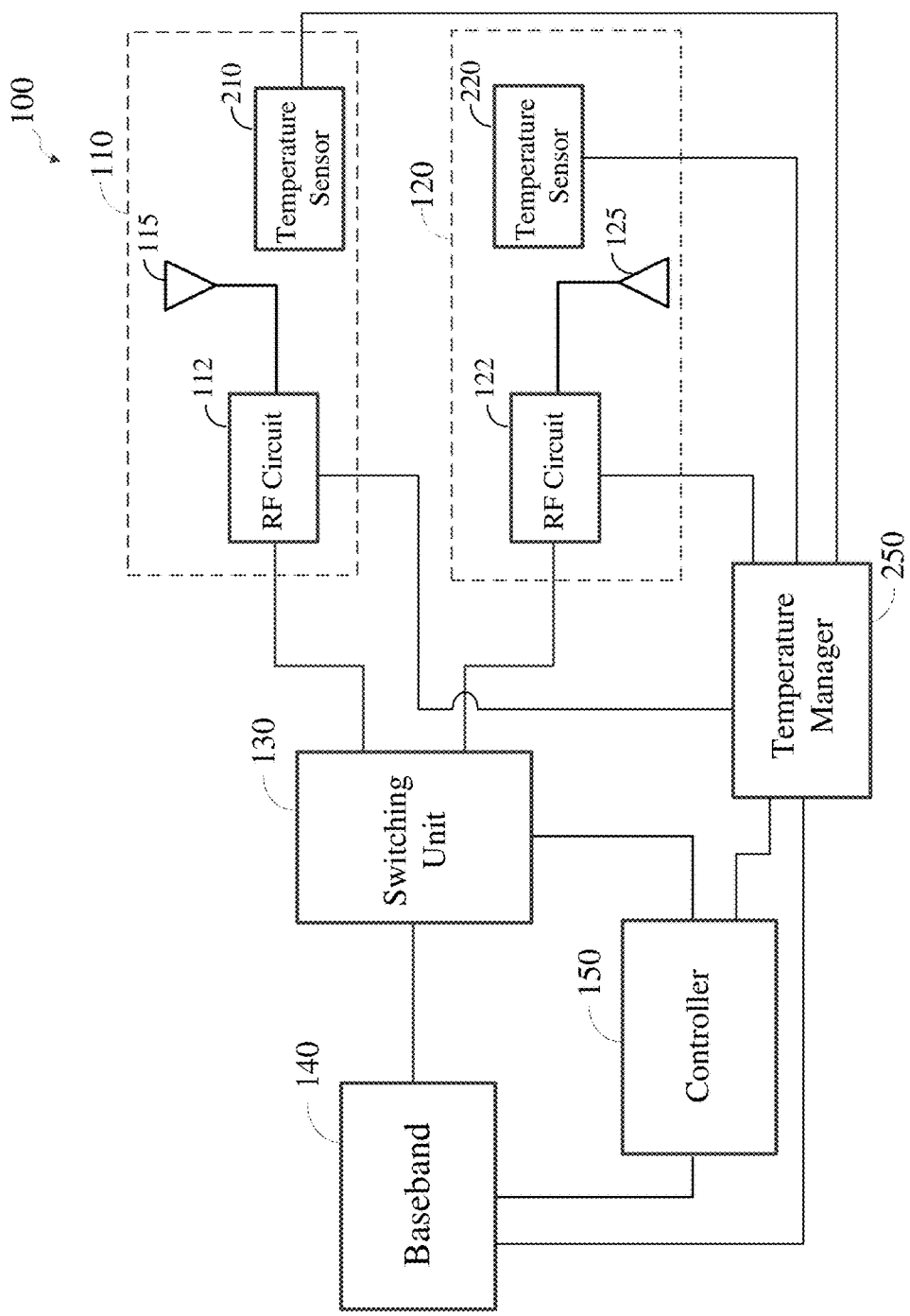
FIG. 2 shows an example of the system including a temperature manager for performing thermal throttling according to certain aspects of the present disclosure.

FIG. 2 shows an example in which the system 100 employs thermal throttling to prevent the system 100 from crossing a critical temperature according to certain aspects of the present disclosure. In this example, the system 100 further includes a first temperature sensor 210, a second temperature sensor 220, and a temperature manager 250. The first temperature sensor 210 is configured to measure the temperature of the first RF module 110, and may be located within or in close proximity to the first RF module 110. The second temperature sensor 220 is configured to measure the temperature of the second RF module 120, and may be located within or in close proximity to the second RF module 120. Each of the temperature sensors 210 and 220 is coupled to the temperature manager 250, and provides temperature readings to the temperature manager 250 indicating the temperature of the respective RF module.

In operation, when the RF diversity controller 150 selects one of the RF modules 110 and 120, the temperature manager 250 monitors the temperature of the selected RF module 110 and 120 based on temperature readings from the respective temperature sensor 210 and 220. When the temperature of the selected RF module reaches a thermal throttling threshold, the temperature manager 250 may start thermal throttling, in which the temperature manager 250 puts the selected RF module to sleep during sleep intervals to cool down the selected RF module and activates the selected RF module during active intervals to transmit and/or receive data. The temperature manager 250 may put the selected RF module to sleep, for example, by gating power to the selected RF module, gating an oscillator signal to a mixer in the selected RF module, etc. The temperature manager 250 may also instruct the baseband processor 140 to suspend sending data to the selected RF module while the selected RF module is asleep.

Thus, during thermal throttling, the active duty cycle of the selected RF module is less than 100%, in which the active duty cycle is a percentage of time that the selected RF module is active. This is because the temperature manager 250 puts the selected RF module to sleep part of the time to cool down the selected RF module. In certain aspects, the temperature manager 250 may adjust the active duty cycle of the selected RF module such that the monitored temperature of the selected RF module is maintained close to a target temperature. The target temperature may be below the critical temperature by a certain amount to help ensure that the temperature of the selected RF module does not cross the critical temperature. The temperature manager 250 may adjust the active duty cycle by adjusting the durations of the sleep intervals relative to the durations of the active intervals. For example, if the monitored temperature of the selected RF module rises above the target temperature, then the temperature manager 250 may decrease the active duty cycle to lower the temperature back to the target temperature. If the monitored temperature of the selected RF module falls below the target temperature, then the temperature manager 250 may increase the active duty cycle to increase throughput. Thus, in this example, the temperature manager 250 adjusts the active duty cycle based on feedback of the temperature of the selected RF module to maintain the temperature of the selected RF module close to the target temperature.

Figure 3:
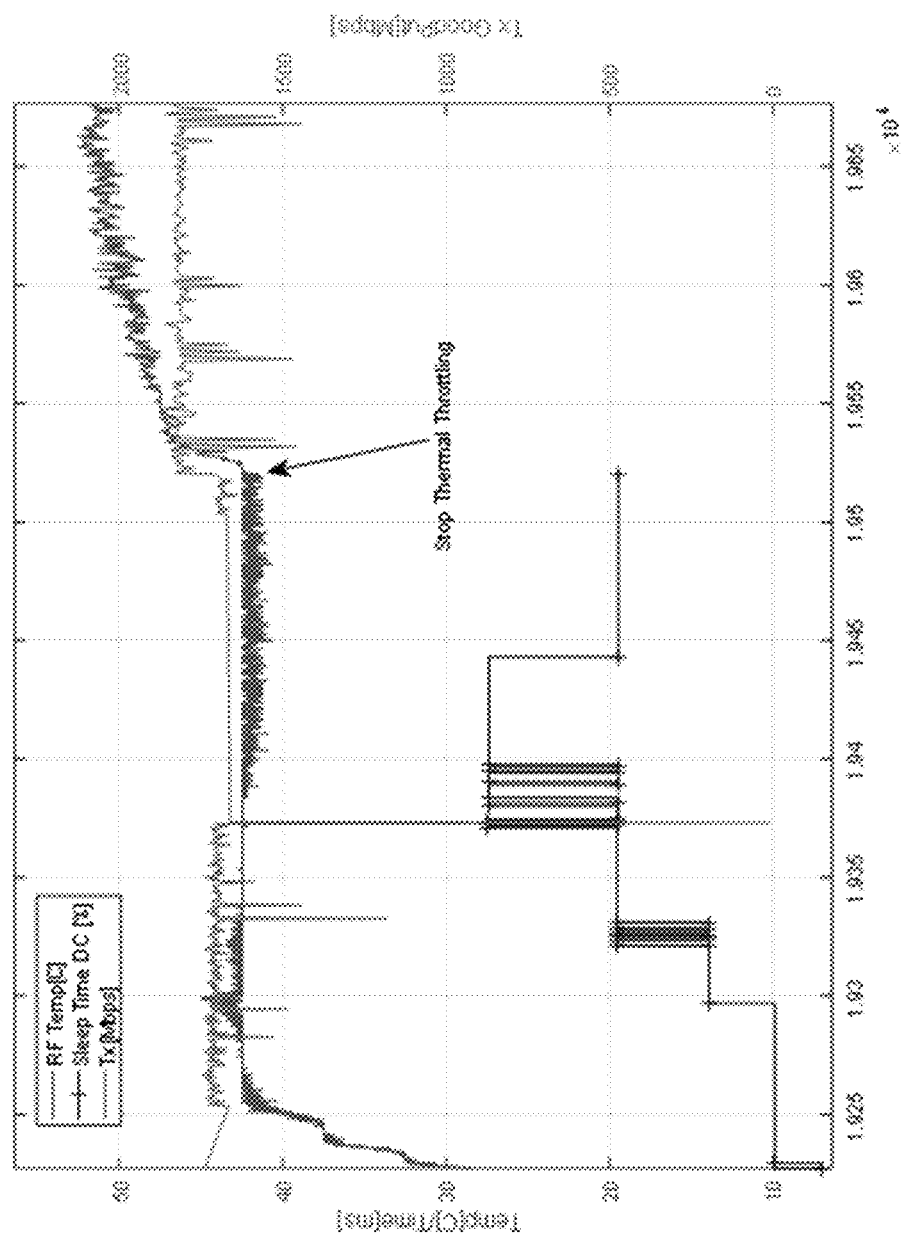
FIG. 3 is a plot illustrating an example of temperature of an RF module over time, throughput of the RF module over time, and the sleep time of the RF module due to thermal throttling.

FIG. 3 shows an example of the temperature of one of the RF modules 110 or 120, the throughput of the RF module, and the sleep time of the RF module due to thermal throttling. For example, a sleep time of 20% indicates that the module is asleep 20% of the time. The sleep time reduces the activity duty cycle of the RF module, which reduces the throughput of the RF module.

As can be seen in FIG. 3, in this example, the temperature manager 250 maintains the temperature of the RF module at approximately 43° C. when thermal throttling is activated and the sleep time is at approximately 20 to 27 ms in 100 ms cycles (i.e., the RF module is put to sleep approximately 20 to 27% of the time). When the thermal throttling is deactivated, the temperature increases up to approximately 52° C. and the throughput increases from approximately 1.6 Gbps to 1.8 Gbps. The point at which thermal throttling is deactivated is indicated by the arrow in FIG. 3 labeled "Stop Thermal Throttling." FIG. 3 shows that the temperature manager 250 is able to keep the temperature of the RF module close to a target temperature (e.g., 43° C.) using thermal throttling at the expense of lower throughput.

As discussed above, the RF diversity controller 150 determines the link quality (e.g., throughput) of each RF module 110 and 120, and selects the RF module having the best link quality (e.g., throughput) for RF transmission and/or reception. However, current implementations of the controller 150 do not take into account the impact of thermal throttling on actual throughput. As a result, the actual throughput of the system 100 may not be optimized when thermal throttling is activated.

Embodiments of the present disclosure provide RF diversity control systems and methods that take into account the impact of thermal throttling on throughput, as discussed further below.

Since thermal throttling has an immediate and direct impact on the system's throughput performance due to the forced sleep intervals (i.e., reduced active duty cycle), the actual throughput of the selected (aka "main") RF module at the target temperature may be lower than the possible throughput of the unselected (aka "secondary") RF module.

When the actual throughput of the main RF module is lower than the possible throughput of the secondary RF module (due to thermal throttling of the main RF module), the controller 150 may switch over to the secondary RF module for transmission and/or reception. This allows the main RF module temperature to cool faster (since it will be fully deactivated) while the secondary RF module is used.

In the above example, the actual throughput (i.e., effective throughput) of the main RF module may be determined by determining an average throughput of the main RF module over a time window (i.e., over one or more cycles, where each cycle includes one sleep interval and one active interval).

By having the above capabilities, the controller 150 will have more degrees of freedom for managing the thermal dissipation while providing better data throughput and faster cooling periods.

Figure 4:
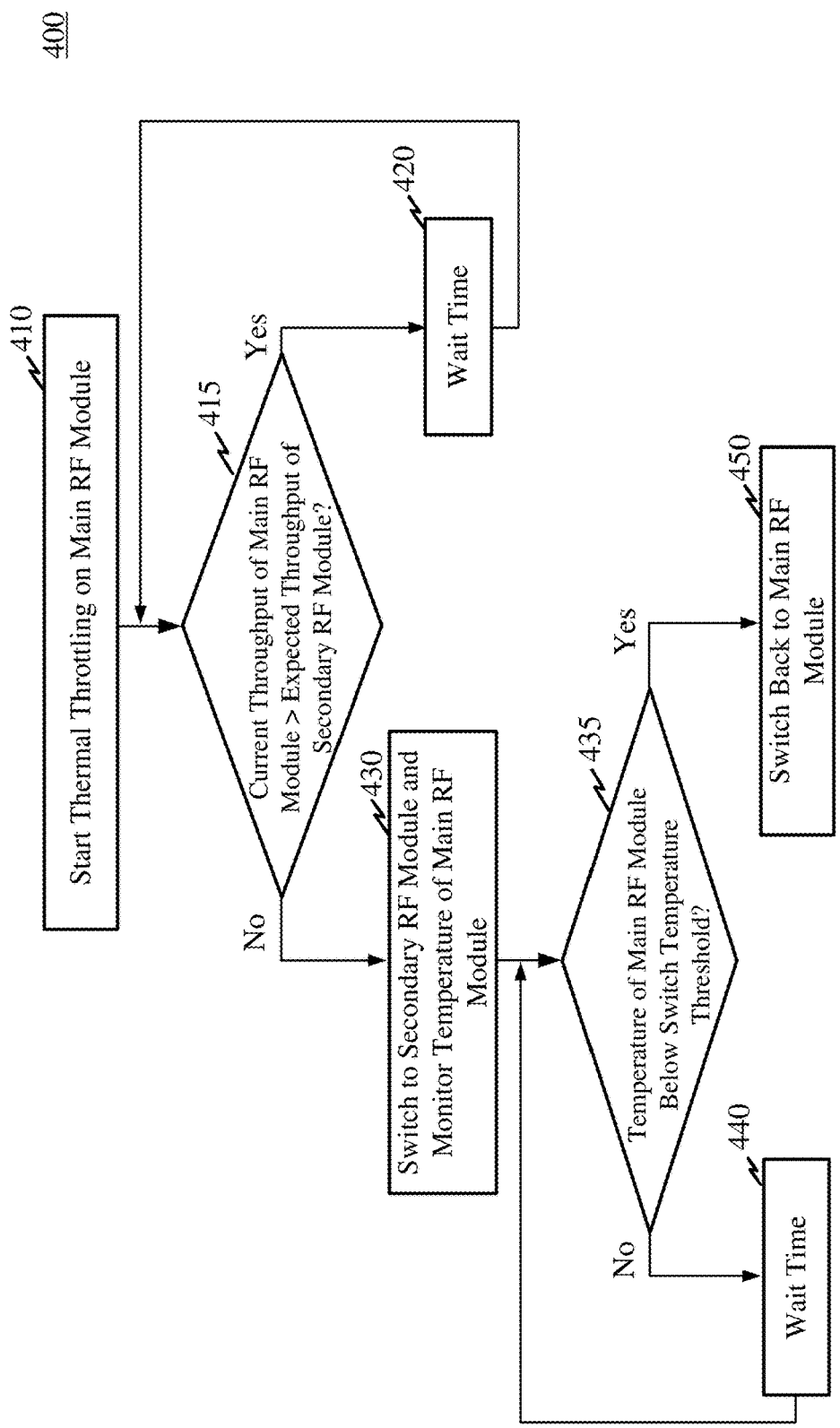
FIG. 4 is a flowchart illustrating an exemplary control method that takes into account the impact of thermal throttling on throughput according to aspects of the present disclosure.

FIG. 4 illustrates an exemplary control method 400 that takes into account the impact of thermal throttling on throughput according to aspects of the present disclosure. The control method 400 may be performed by the RF diversity controller 150 and the temperature manager 250.

Before the start of the method 400, the controller 150 determines a link quality (e.g., throughput) for each RF module 110 and 120, and selects the RF module having the best (highest) link quality for RF transmission and/or reception. For example, the controller 150 may determine a throughput for each RF module 110 and 120, and select the RF module having the highest throughput for RF transmission and/or reception. The determined throughput for each RF module represents an initial throughput of the RF module before thermal throttling is activated. In the discussion below, the selected RF module is referred to as the main RF module, and the unselected RF module is referred to as the secondary RF module.

After the selection, the controller 150 instructs (configures) the switching unit 130 to couple the main RF module to the baseband processor 140. After the switch, the system 100 receives and/or transmits RF signals using the main RF module (i.e., the selected RF module).

At step 410, thermal throttling starts on the main RF module. This may occur, for example, when the monitored temperature of the main RF module reaches the thermal throttling threshold. During thermal throttling, the temperature manager 250 adjusts the active duty cycle of the main RF module based on feedback of the temperature of the main RF module to maintain the temperature of the main RF module close to a target temperature, as discussed above. The thermal throttling decreases the throughput of the main RF module, as discussed above.

At step 415, a determination is made whether the current throughput of the main RF module is higher than an expected throughput of the secondary RF module. The current throughput of the main RF module is lower than the initial throughput of the main RF module due to thermal throttling. The current throughput of the main RF module may be determined, for example, by determining an average throughput of the main RF module over a time window (i.e., over one or more cycles, where each cycle includes one sleep interval and one active interval). In another example, the current throughput may be determined based on the initial throughput of the main RF module and the active duty cycle of the main RF module. For example, if the active duty cycle of the main RF module is 70% due to thermal throttling, then the current throughput of the main RF module is approximately equal to 70% of the initial throughput (i.e., throughput without thermal throttling). The expected throughput of the secondary RF module may be the throughput of the secondary RF module that was determined above.

If the current throughput of the main RF module is higher than the expected throughput of the secondary RF module, then the system continues to use the main RF module for receiving and/or transmitting RF signals. In this case, the system waits for a predetermined time at step 420, and then repeats step 415.

If the current throughput of the main RF module is lower than the expected throughput of the secondary RF module, then the system switches to the secondary RF module for receiving and/or transmitting RF signals at step 430. This occurs when thermal throttling reduces the throughput of the main RF module below the expected throughput of the secondary RF module. In this case, the system can achieve higher throughput using the secondary RF module. Switching to the secondary RF module allows the main RF module to cool faster since it is fully deactivated. During the time that the secondary RF module is used for transmission and/or reception, the temperature of the main RF module is monitored using the respective temperature sensor.

If the current throughput of the main RF module is equal to the throughput of the secondary RF module at step 415, then the system may continue to use the main RF module or switch to the secondary RF module.

At step 435, a determination is made whether the monitored temperature of the main RF module has dropped below a switch temperature threshold. The switch temperature threshold may be equal to the thermal throttling threshold or another temperature. If the temperature of the main RF module is above the switch temperature threshold, then the system continues to use the secondary RF module for receiving and/or transmitting RF signals. In this case, the system waits for a predetermined time at step 440, and then repeats step 435.

If the temperature of the main RF module is below the switch temperature threshold, then the system switches back to the main RF module for receiving and/or transmitting RF signals at step 450. This occurs when the main RF module has cooled down sufficiently to bring down the temperature of the main RF module to the switch temperature threshold. After the system is switched back to the main RF module, the method 400 may be repeated.

If the temperature of the main RF module is equal to the switch temperature threshold at step 435, then the system may continue to use the secondary RF module or switch back to the main RF module.

As discussed, the system switches back to the main RF module at step 435 when the temperature of the main RF module drops below the switch temperature threshold. In one example, the switch temperature threshold is approximately equal to the thermal throttling threshold. Thus, in this example, immediately after the system switches back to the main RF module, the throughput of the main RF module may be approximately equal to the throughput of the main RF module without thermal throttling. In another example, the switch temperature threshold may be another temperature that is below the target temperature. In this example, the switch temperature threshold may be chosen such that, by the time the main RF module has cooled down to the switch temperature threshold, the throughput of the main RF module is expected to be above the throughput of the secondary RF module when the system switches back to the main RF module. In this example, the switch temperature threshold may be determined by running simulations and/or tests on the system to estimate by how much the main RF module needs to cool down for the throughput of the main RF module to be above the throughput of the secondary RF module. In another example, the switch temperature threshold may be simply set to the thermal throttling threshold.

In the above discussion, the controller 150 may power off the RF module that is not currently in use. For example, when the system uses the main RF module for receiving and/or transmitting RF signals, the controller 150 may power off the secondary RF module. When the system uses the secondary RF module for receiving and/or transmitting RF signals, the controller 150 may power off the main RF module, allowing the main RF module to cool off faster.

In the above discussion, throughput may be defined as an amount of received and/or transmitted data per unit of time (e.g., gigabits per second Gbps).

Figure 5:
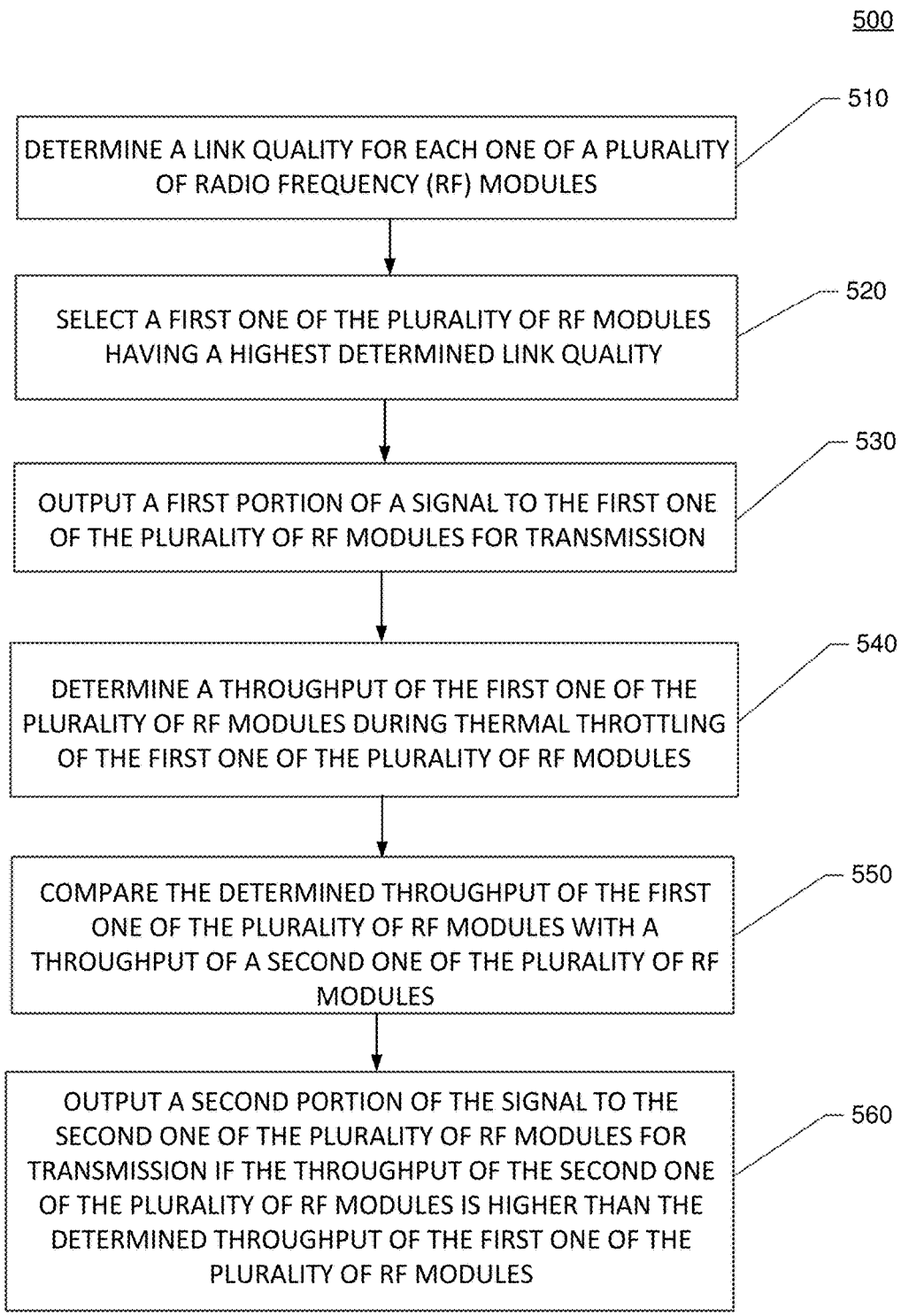
FIG. 5 is a flowchart illustrating an exemplary method for wireless communications according to aspects of the present disclosure.

FIG. 5 is a flowchart illustrating an exemplary method 500 according to certain aspects of the present disclosure. The method 500 may be performed by the controller 150 and/or the temperature manager 250.

At step 510, a link quality for each one of a plurality of radio frequency (RF) modules is determined. For example, the link quality for each one of the RF modules (e.g., RF modules 110 and 120) may include a throughput of the RF module.

At step 520, a first one of the plurality RF modules having a highest determined link quality is selected. For example, a first one of the plurality of RF modules having the highest determined throughput may be selected.

At step 530, a first portion of a signal is output to the first one of the plurality of RF modules for transmission. For example, the first portion of the signal (e.g., baseband signal) may be output to first one of the plurality of RF modules via a switching unit (e.g., switching unit 130).

At step 540, a throughput of the first one of the plurality of RF modules during thermal throttling of the first one of the plurality of RF modules is determined. For example, the throughput of the first one of the plurality of RF modules during thermal throttling may be less than the throughput of the first one of the plurality of RF modules before thermal throttling since thermal throttling reduces throughput, as discussed above.

At step 550, the determined throughput of the first one of the plurality of RF modules is compared with a throughput of a second one of the plurality of RF modules. For example, the throughput of the second one of the plurality of RF modules may be the throughput of the second one of the plurality of RF modules without thermal throttling of the second one of the plurality of RF modules. The throughput of the second one of the plurality of RF modules may correspond to the expected throughput of the secondary RF module discussed above.

At step 560, a second portion of the signal is output to the second one of the plurality of RF modules for transmission if the throughput of the second one of the plurality of RF modules is higher than the determined throughput of the first one of the plurality of RF modules. In this case, higher throughput may be achieved by switching over transmission from the first one of the plurality of RF modules to the second one of the plurality of RF modules.

If the throughput of the second one of the plurality of RF modules is lower than the determined throughput of the first one of the plurality of RF modules, then the second portion of the signal may be output to the first one of the plurality of RF modules for transmission. In this case, higher throughput may be achieved by continuing to use the first one of the plurality of RF modules for transmission.

The method 500 may also include the optional steps of monitoring a temperature of the first one of the plurality of RF modules during a time that the second portion of the signal is output to the second one of the plurality of RF modules, comparing the monitored temperature with a temperature threshold, and outputting a third portion of the signal to the first one of the plurality of RF modules for transmission if the monitored temperature is below the temperature threshold. For example, the temperature may be monitored using a temperature sensor (e.g., temperature sensor 210 or 220) located within or in close proximity to the first one of the plurality of RF modules, and the temperature threshold may correspond to the switch temperature threshold discussed above. If the monitored temperature is above the temperature threshold, then the third portion of the signal may be output to the second one of the plurality of RF modules for transmission.

Figure 6:
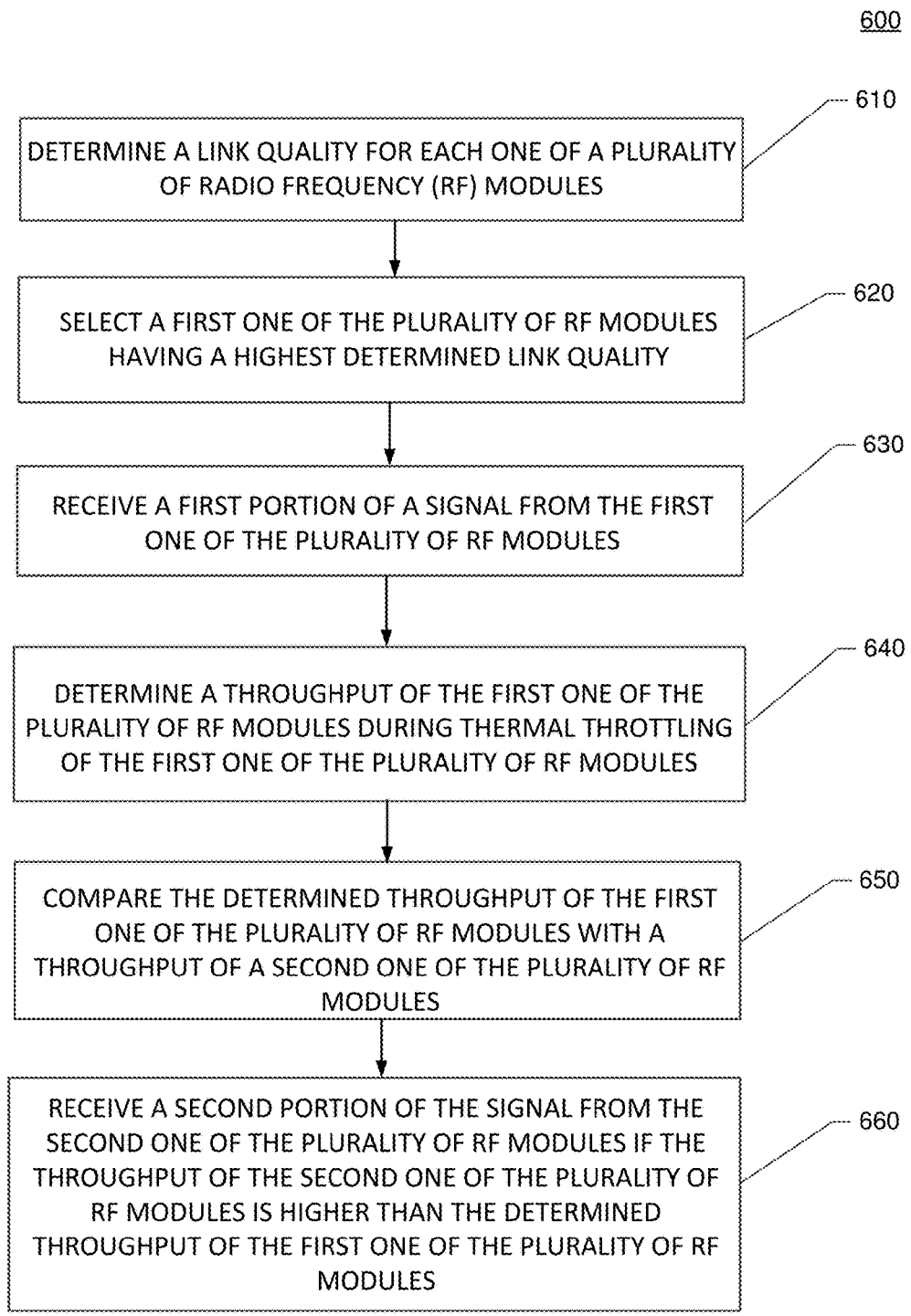
FIG. 6 is a flowchart illustrating another exemplary method for wireless communications according to aspects of the present disclosure.

FIG. 6 is a flowchart illustrating an exemplary method 600 according to certain aspects of the present disclosure. The method 600 may be performed by the controller 150 and/or the temperature manager 250.

At step 610, a link quality for each one of a plurality of radio frequency (RF) modules is determined. For example, the link quality for each one of the RF modules (e.g., RF modules 110 and 120) may include a throughput of the RF module. In another example, the link quality for each one of the RF modules may include an SNR, RSSI or C/I of a signal received via the RF module.

At step 620, a first one of the plurality RF modules having a highest determined link quality is selected. For example, a first one of the plurality of RF modules having the highest determined throughput may be selected.

At step 630, a first portion of a signal is received from the first one of the plurality of RF modules.

At step 640, a throughput of the first one of the plurality of RF modules during thermal throttling of the first one of the plurality of RF modules is determined. For example, the throughput of the first one of the plurality of RF modules during thermal throttling may be less than the throughput of the first one of the plurality of RF modules before thermal throttling since thermal throttling reduces throughput, as discussed above.

At step 650, the determined throughput of the first one of the plurality of RF modules is compared with a throughput of a second one of the plurality of RF modules. For example, the throughput of the second one of the plurality of RF modules may be the throughput of the second one of the plurality of RF modules without thermal throttling of the second one of the plurality of RF modules. The throughput of the second one of the plurality of RF modules may correspond to the expected throughput of the secondary RF module discussed above.

At step 660, a second portion of the signal is received from the second one of the plurality of RF modules if the throughput of the second one of the plurality of RF modules is higher than the determined throughput of the first one of the plurality of RF modules. In this case, higher throughput may be achieved by switching over reception from the first one of the plurality of RF modules to the second one of the plurality of RF modules.

If the throughput of the second one of the plurality of RF modules is lower than the determined throughput of the first one of the plurality of RF modules, then the second portion of the signal may be received from the first one of the plurality of RF modules. In this case, higher throughput may be achieved by continuing to use the first one of the plurality of RF modules for reception.

The method 600 may also include the optional steps of monitoring a temperature of the first one of the plurality of RF modules during a time that the second portion of the signal is received from the second one of the plurality of RF modules, comparing the monitored temperature with a temperature threshold, and receiving a third portion of the signal from the first one of the plurality of RF modules if the monitored temperature is below the temperature threshold. For example, the temperature may be monitored using a temperature sensor (e.g., temperature sensor 210 or 220) located within or in close proximity to the first one of the plurality of RF modules, and the temperature threshold may correspond to the switch temperature threshold discussed above. If the monitored temperature is above the temperature threshold, then the third portion of the signal may be received from the second one of the plurality of RF modules.

The techniques described herein may be used for various broadband wireless communication systems, including communication systems that are based on a single-carrier or an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IF-DMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings described herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 7:
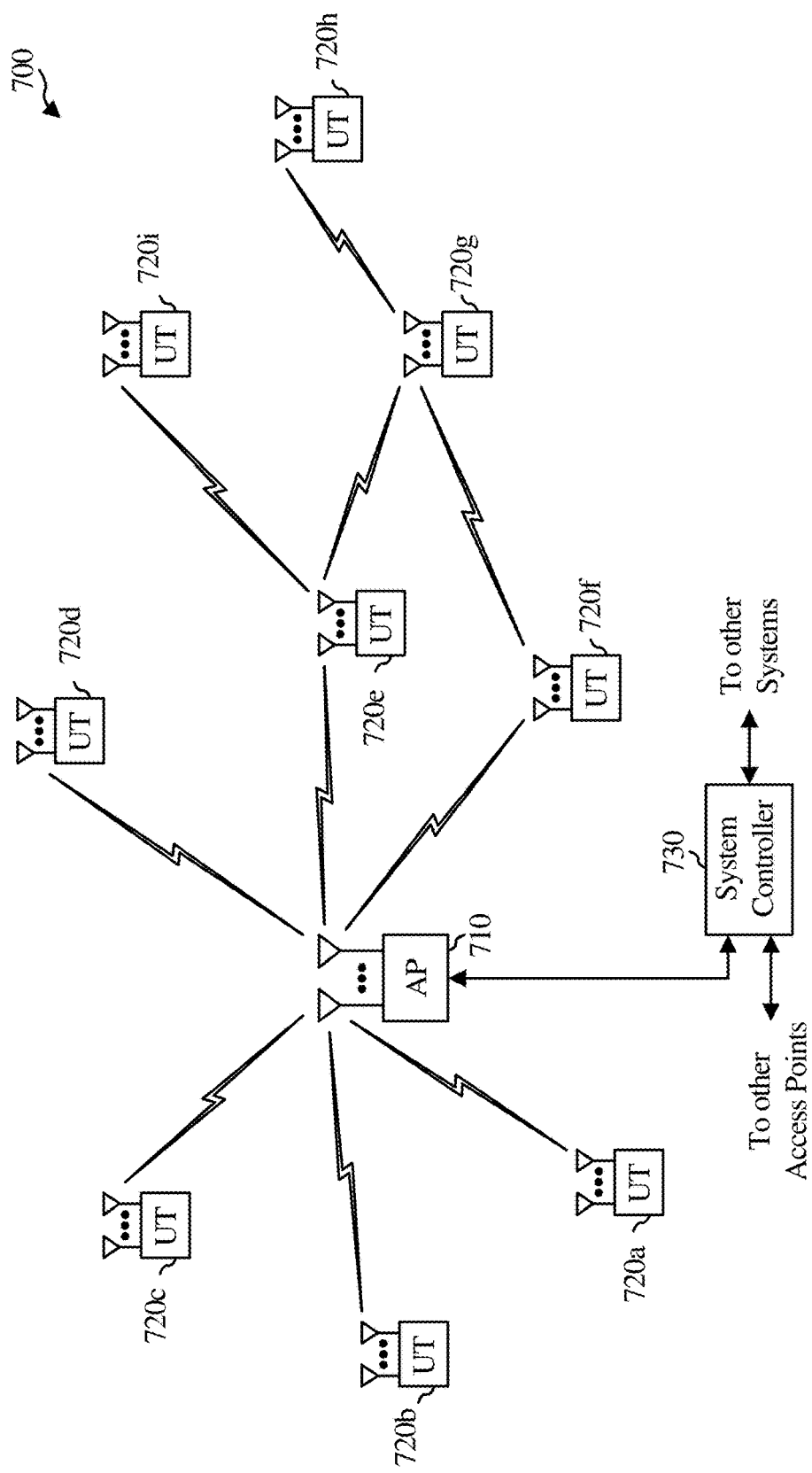
FIG. 7 illustrates an exemplary wireless communications network, in which aspects of the present disclosure may be implemented.

FIG. 7 illustrates an example of a communications system 700 with access points and user terminals in which aspects of the present disclosure may be practiced. For simplicity, only one access point 710 is shown in FIG. 7. An access point is generally a fixed station that communicates with the user terminals and may also be referred to as a base station or some other terminology. A user terminal may be fixed or mobile and may also be referred to as a mobile station, a wireless device, or some other terminology. Access point 710 may communicate with one or more user terminals 720 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 730 couples to and provides coordination and control for the access points.

In the example shown in FIG. 7, the RF diversity system 100 may be incorporated in an access point 710 or a user terminal 720. For the example in which the system 100 is incorporated in an access point 710, the wireless target device discussed above may be a user terminal 720. For the example in which the system 100 is incorporated in a user terminal 720, the wireless target device discussed above may be an access point 710.

Figure 8:
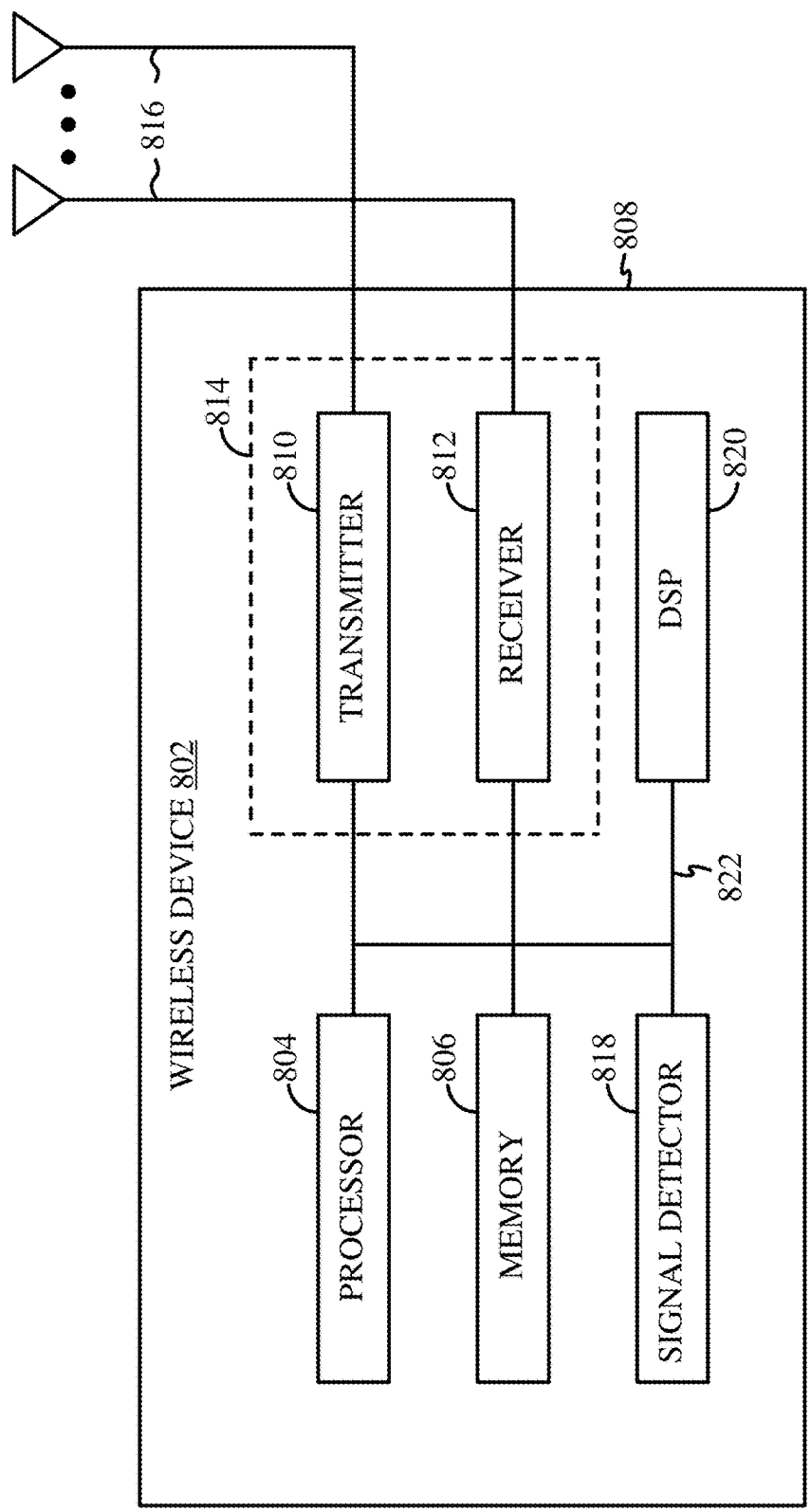
FIG. 8 illustrates an exemplary wireless device, in which aspects of the present disclosure may be implemented.

FIG. 8 illustrates various components that may be utilized in a wireless device 802 in which aspects of the present disclosure may be practiced. The wireless device 802 is an example of a device that may be configured to implement the various methods described herein. The wireless device 802 may be an access point 710 or a user terminal 720.

The wireless device 802 may include a processor 804 which controls operation of the wireless device 802. Memory 806, which may include both read-only memory (ROM) and random access memory (RAM), provides instructions and data to the processor 804. A portion of the memory 806 may also include non-volatile random access memory (NVRAM). The processor 804 typically performs logical and arithmetic operations based on program instructions stored within the memory 806. The instructions in the memory 806 may be executable to implement the methods described herein. The processor 804 may, for example, direct all or some of the operations of the various flowcharts of the drawings to implement the thermal throttling, the control methods and/or other features of the present disclosure. In this regard, the processor 804 may implement the controller 150 and/or the temperature manager 250 discussed above.

The wireless device 802 may also include a housing 808 that may include a transmitter 810 and a receiver 812 to allow transmission and reception of data between the wireless device 802 and a target wireless device. The transmitter 810 and receiver 812 may be combined into a transceiver 814. A plurality of transmit antennas 816 may be attached to the housing 808 and electrically coupled to the transceiver 814. The transceiver 814 may include multiple transmitters and receivers to implement the RF modules 110 and 120 according to any of the embodiments of the present disclosure.

The wireless device 802 may also include a signal detector 818 that may be used in an effort to detect and quantify the level of signals received by the transceiver 814. The signal detector 818 may detect such signals as total energy, energy per subcarrier per symbol, power spectral density and other signals. For example, the signal detector 818 may be used to determine an SNR, RSSI and/or C/I for each of the RF modules, as discussed above.

The wireless device 802 may also include a digital signal processor (DSP) 820 for use in processing signals. For example, the DSP 820 may implement the baseband processor 140. The various components of the wireless device 802 may be coupled together by an interface 822 (e.g., system bus), which may include a power bus, a control signal bus, and a status signal bus in addition to a data bus. The interface 822 may also include the switching unit 130 discussed above.

Examples of means for determining a link quality for each one of a plurality of radio frequency (RF) modules include at least one of the controller 150, or the processor 804. Examples of means for selecting a first one of the plurality of RF modules having a highest determined link quality include at least one of the controller 150, the signal detector 818, or the processor 804. Examples of means for outputting a first portion of a signal to the first one of the plurality of RF modules for transmission include at least one of the baseband processor 140, the switching unit 130, or the interface 822. Examples of means for determining a throughput of the first one of the plurality of RF modules during thermal throttling of the first one of the plurality of RF modules include at least one of the controller 150, or the processor 804. Examples of means for comparing the determined throughput of the first one of the plurality of RF modules with a throughput of a second one of the plurality of RF modules include at least one of the controller 150, or the processor 804. Examples of means for outputting a second portion of the signal to the second one of the plurality of RF modules for transmission if the throughput of the second one of the plurality of RF modules is higher than the determined throughput of the first one of the plurality of RF modules include at least one of the switching unit 130, or the interface 822.

Examples of means for outputting the second portion of the signal to the first one of the plurality of RF modules for transmission if the throughput of the second one of the plurality of RF modules is lower than the determined throughput of the first one of the plurality of RF modules include at least one of the switching unit 130, or the interface 822.

Examples of means for monitoring a temperature of the first one of the plurality of RF modules include at least one of the first temperature sensor 210, the second temperature sensor 220, the temperature manager 250, the controller 150, or the processor 804. Examples of means for comparing the monitored temperature with a temperature threshold include at least one of the temperature manager 250, the controller 150, or the processor 804. Examples of means for outputting a third portion of the signal to the first one of the plurality of RF modules for transmission if the monitored temperature is below the temperature threshold include at least one of the switching unit 130, or the interface 822. Examples of means for putting the first one of the plurality of RF modules to sleep during sleep intervals and activating the first one of the plurality of RF modules during active intervals include at least one of the temperature manager 250, or the processor 804. Examples of means for determining an average throughput of the first one of the plurality of RF modules over one or more cycles include at least one of the controller 150, or the processor 804. Examples of means for determining the throughput of the first one of the plurality of RF modules during the thermal throttling of the first one of the plurality of RF modules based on an active duty cycle of the first one of the plurality of RF modules during the thermal throttling of the first one of the plurality of RF modules include at least one of the controller 150, or the processor 804.

Examples of means for determining a link quality for each one of a plurality of radio frequency (RF) modules include at least one of the controller 150, or the processor 804. Examples of means for selecting a first one of the plurality of RF modules having a highest determined link quality include at least one of the controller 150, the signal detector 818, or the processor 804. Examples of means for receiving a first portion of a signal from the first one of the plurality of RF modules include at least one the baseband processor 140, the switching unit 130, or the interface 822. Examples of means for determining a throughput of the first one of the plurality of RF modules during thermal throttling of the first one of the plurality of RF modules include at least one of the controller 150, or the processor 804. Examples of means for comparing the determined throughput of the first one of the plurality of RF modules with a throughput of a second one of the plurality of RF modules include at least one of the controller 150, or the processor 804. Examples of means for receiving a second portion of the signal from the second one of the plurality of RF modules if the throughput of the second one of the plurality of RF modules is higher than the determined throughput of the first one of the plurality of RF modules include at least one of the switching unit 130, or the interface 822.

Examples of means for receiving the second portion of the signal from the first one of the plurality of RF modules if the throughput of the second one of the plurality of RF modules is lower than the determined throughput of the first one of the plurality of RF modules include at least one of the switching unit 130, or the interface 822.

Examples of means for monitoring a temperature of the first one of the plurality of RF modules include at least one of the first temperature sensor 210, the second temperature sensor 220, the temperature manager 250, the controller 150, or the processor 804. Examples of means for comparing the monitored temperature with a temperature threshold include at least one of the temperature manager 250, the controller 150, or the processor 804. Examples of means for receiving a third portion of the signal from the first one of the plurality of RF modules if the monitored temperature is below the temperature threshold include at least one of the switching unit 130, or the interface 822.

As used herein, the term "generating" encompasses a wide variety of actions. For example, "generating" may include calculating, causing, computing, creating, determining, processing, deriving, investigating, making, producing, providing, giving rise to, leading to, resulting in, looking up (e.g., looking up in a table, a database or another data structure), ascertaining and the like. Also, "generating" may include receiving (e.g., receiving information), accessing (e.g., accessing data in a memory) and the like. Also, "generating" may include resolving, selecting, choosing, establishing and the like.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Also, "determining" may include measuring, estimating and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any such list including multiples of the same members (e.g., any lists that include aa, bb, or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
   an interface; and
   a processing system configured to:
      determine a link quality for each one of a plurality of radio frequency (RF) modules;
      select a first one of the plurality of RF modules having a highest determined link quality;
      generate a signal;
      configure the interface to output a first portion of the signal to the first one of the plurality of RF modules for transmission;
      determine a throughput of the first one of the plurality of RF modules during thermal throttling of the first one of the plurality of RF modules;
      compare the determined throughput of the first one of the plurality of RF modules with a throughput of a second one of the plurality of RF modules; and
      configure the interface to output a second portion of the signal to the second one of the plurality of RF modules for transmission if the throughput of the second one of the plurality of RF modules is higher than the determined throughput of the first one of the plurality of RF modules.

2. The apparatus of claim 1, wherein the processing system is configured to configure the interface to output the second portion of the signal to the first one of the plurality of RF modules for transmission if the throughput of the second one of the plurality of RF modules is lower than the determined throughput of the first one of the plurality of RF modules.

3. The apparatus of claim 1, wherein the throughput of the second one of the plurality of RF modules is without thermal throttling of the second one of the plurality of RF modules.

4. The apparatus of claim 1, wherein the link quality of the first one of the plurality of RF modules comprises a throughput of the first one of the plurality of RF modules before the thermal throttling of the first one of the plurality of RF modules.

5. The apparatus of claim 1, wherein the processing system is further configured to:
   monitor a temperature of the first one of the plurality of RF modules during a time that the second portion of the signal is output to the second one of the plurality of RF modules;
   compare the monitored temperature with a temperature threshold; and
   configure the interface to output a third portion of the signal to the first one of the plurality of RF modules for transmission if the monitored temperature is below the temperature threshold.

6. The apparatus of claim 1, wherein, during the thermal throttling of the first one of the plurality of RF modules, the processing system is configured to put the first one of the plurality of RF modules to sleep during sleep intervals and activate the first one of the plurality of RF modules during active intervals.

7. The apparatus of claim 6, wherein the processing system is configured to determine the throughput of the first one of the plurality of RF modules during the thermal throttling of the first one of the plurality of RF modules by determining an average throughput of the first one of the plurality of RF modules over one or more cycles, each one of the one or more cycles including a respective one of the sleep intervals and a respective one of the active intervals.

8. The apparatus of claim 1, wherein the processing system is configured to determine the throughput of the first one of the plurality of RF modules during the thermal throttling of the first one of the plurality of RF modules based on an active duty cycle of the first one of the plurality of RF modules during the thermal throttling of the first one of the plurality of RF modules.

9. A wireless node, comprising:
   a plurality of radio frequency (RF) modules;
   an interface; and
   a processing system configured to:

determine a link quality for each one of the plurality of RF modules;

select a first one of the plurality of RF modules having a highest determined link quality;

generate a signal;

configure the interface to output a first portion of the signal to the first one of the plurality of RF modules for transmission;

determine a throughput of the first one of the plurality of RF modules during thermal throttling of the first one of the plurality of RF modules;

compare the determined throughput of the first one of the plurality of RF modules with a throughput of a second one of the plurality of RF modules; and configure the interface to output a second portion of the signal to the second one of the plurality of RF modules for transmission if the throughput of the second one of the plurality of RF modules is higher than the determined throughput of the first one of the plurality of RF modules.

10. An apparatus for wireless communications, comprising:

an interface;

a processing system configured to:

determine a link quality for each one of a plurality of radio frequency (RF) modules;

select a first one of the plurality of RF modules having a highest determined link quality;

configure the interface to receive a first portion of a signal from the first one of the plurality of RF modules;

determine a throughput of the first one of the plurality of RF modules during thermal throttling of the first one of the plurality of RF modules;

compare the determined throughput of the first one of the plurality of RF modules with a throughput of a second one of the plurality of RF modules; and configure the interface to receive a second portion of the signal from the second one of the plurality of RF modules if the throughput of the second one of the plurality of RF modules is higher than the determined throughput of the first one of the plurality of RF modules.

11. The apparatus of claim 10, wherein the processing system is configured to configure the interface to receive the second portion of the signal from the first one of the plurality of RF modules if the throughput of the second one of the plurality of RF modules is lower than the determined throughput of the first one of the plurality of RF modules.

12. The apparatus of claim 10, wherein the throughput of the second one of the plurality of RF modules is without thermal throttling of the second one of the plurality of RF modules.

13. The apparatus of claim 10, wherein the link quality of the first one of the plurality of RF modules comprises a throughput of the first one of the plurality of RF modules before the thermal throttling of the first one of the plurality of RF modules.

14. The apparatus of claim 10, wherein the processing system is further configured to:

monitor a temperature of the first one of the plurality of RF modules during a time that the second portion of the signal is received from the second one of the plurality of RF modules;

compare the monitored temperature with a temperature threshold; and configure the interface receive a third portion of the signal from the first one of the plurality of RF modules if the monitored temperature is below the temperature threshold.

15. The apparatus of claim 10, wherein the processing system is configured to determine the link quality for each one of the plurality of RF modules based on at least one of a signal-to-noise ratio (SNR), a received signal strength indictor (RSSI), or a carrier-to-interference (C/I) ratio of a signal received via the RF module.

16. The apparatus of claim 10, wherein, during the thermal throttling of the first one of the plurality of RF modules, the processing system is configured to put the first one of the plurality of RF modules to sleep during sleep intervals and activate the first one of the plurality of RF modules during active intervals.

17. The apparatus of claim 16, wherein the processing system is configured to determine the throughput of the first one of the plurality of RF modules during the thermal throttling of the first one of the plurality of RF modules by determining an average throughput of the first one of the plurality of RF modules over one or more cycles, each one of the one or more cycles including a respective one of the sleep intervals and a respective one of the active intervals.

18. The apparatus of claim 10, wherein the processing system is configured to determine the throughput of the first one of the plurality of RF modules during the thermal throttling of the first one of the plurality of RF modules based on an active duty cycle of the first one of the plurality of RF modules during the thermal throttling of the first one of the plurality of RF modules.

19. The apparatus of claim 10, further comprising the plurality of RF modules, wherein the apparatus is configured as a wireless node, and the interface is configured to:

receive the first portion of the signal from another wireless node via the first one of the plurality of RF modules; and receive the second portion of the signal from the other wireless node via the second one of the plurality of RF modules.

* * * * *